United States Patent [19]

Stanley

[11] Patent Number: 5,371,133
[45] Date of Patent: Dec. 6, 1994

[54] PROCESS FOR PREPARING URETHANE/ACRYLIC-OR-VINYL LATEXES

[75] Inventor: Henry Stanley, Cedar Grove, N.J.

[73] Assignee: National Starch and Chemical Investment Holding Corporation, Bridgewater, N.J.

[21] Appl. No.: 206,780

[22] Filed: Mar. 4, 1994

Related U.S. Application Data

[63] Continuation-in-part of Ser. No. 982,198, Nov. 25, 1992, abandoned, which is a continuation-in-part of Ser. No. 581,509, Sep. 12, 1990, abandoned.

[51] Int. Cl.$^5$ .................................................. C08J 3/02
[52] U.S. Cl. .................................... 524/457; 524/507
[58] Field of Search ................................. 524/457, 507

[56] References Cited

U.S. PATENT DOCUMENTS

| | | | |
|---|---|---|---|
| 2,946,767 | 7/1960 | Gassmann | 260/47 |
| 2,968,575 | 1/1961 | Mallonee | 106/287 |
| 3,257,476 | 6/1966 | Tobolsky et al. | 260/859 |
| 3,291,859 | 12/1966 | Tobolsky | 260/859 |
| 3,479,310 | 11/1969 | Dietrich et al. | 260/29.2 |
| 3,658,939 | 4/1972 | Carpenter et al. | 260/858 |
| 3,684,758 | 8/1972 | Honig et al. | 260/29.6 |
| 3,684,759 | 8/1972 | Reiff et al. | 260/29.6 |
| 3,705,164 | 12/1972 | Honig et al. | 260/29.6 |
| 3,759,873 | 9/1973 | Hudak | 260/75 |
| 3,865,898 | 2/1975 | Tobolsky | 260/859 |
| 4,198,330 | 4/1980 | Kaizermann et al. | 260/29.6 |
| 4,317,895 | 3/1982 | Guagliardo et al. | 524/500 |
| 4,318,833 | 3/1982 | Guagliardo | 524/457 |
| 4,644,030 | 2/1987 | Loewrigkeit et al. | 524/457 |
| 4,730,021 | 3/1988 | Zom et al. | 524/591 |
| 4,927,876 | 5/1990 | Coogan et al. | 524/457 |

FOREIGN PATENT DOCUMENTS

| | | |
|---|---|---|
| 0308115 | 5/1988 | European Pat. Off. . |
| 0552420 | 10/1992 | European Pat. Off. . |

*Primary Examiner*—Judy M. Reddick
*Attorney, Agent, or Firm*—Jane E. Gennaro

[57] ABSTRACT

This is a method for the preparation of polyurethane/acrylic-or-vinyl latexes for use in waterborne adhesives or coatings in which the urethane polymer component has no urea linkages. A fully reacted emulsifiable polyurethane is prepared in an acrylic or vinyl monomer, which acts as the solvent or diluent for the polyurethane. The monomer and polyurethane are then co-emulsified, free radical initiators are added, and a regular acrylic or vinyl addition polymerization is carried out.

6 Claims, No Drawings

PROCESS FOR PREPARING URETHANE/ACRYLIC-OR-VINYL LATEXES

This invention is a continuation-in-part of application Ser. No. 07/982,198, filed on Nov. 25, 1992, now abandoned, which was a continuation in part of application Ser. No. 07/581,509, filed on Sep. 12, 1990, now abandoned.

FIELD OF THE INVENTION

This invention pertains to urethane/acrylic-or-vinyl emulsions useful as coatings or adhesives.

BACKGROUND OF THE INVENTION

It is now recognized that waterborne urethane/acrylic-or-vinyl emulsions can be prepared for use as coatings or adhesives with the advantage over earlier systems of being essentially free of volatile organic solvents. U.S. Pat. No. 4,644,030 issued to Loewrigkeit et al. teaches that these systems can be made by producing an isocyanate terminated polyurethane prepolymer in the presence of inert liquid polymerizable ethylenically unsaturated monomer, dispersing the prepolymer and monomer into water, chain extending the prepolymer, and subjecting the aqueous dispersion to vinyl addition polymerization conditions to polymerize the monomer. The use of the monomer as reactive diluent and solvent eliminates the need for an organic solvent medium and is claimed to result in intermixed or interpenetrated polymers. In the sequence followed in the process of this reference, the prepolymer polyurethane is dispersed into water and then chain extended. This sequence requires that the chain extender have hydrogens that are more reactive with isocyanate than does water. The chain extenders of choice for this purpose are typically and preferably organic polyamines. The result is a urethane polymer having both urethane and urea linkages.

U.S. Pat. No. 4,927,876 issued to Coogan et al. discloses a similar process and further discloses that the prepolymer polyurethane may be chain extended with water. As will be appreciated, when water is used as a chain extender, the result is a polymer having both urethane and urea linkages.

In general, urethane polymers containing no urea linkages will produce clearer films or coatings. It is assumed that this occurs because in some cases the presence of urea linkages could lead to crystallinity of the polymers, which translates to opacity in the resultant films or coatings. Therefore, there is a need for a method of preparing urethane/acrylic-or-vinyl emulsions in which the urethane polymer component contains no urea linkages.

SUMMARY OF THE INVENTION

This invention is a process for the preparation of a polymeric urethane/acrylic-or-vinyl latex in which the urethane polymer component contains no urea linkages comprising the sequential steps of: (1) providing an acrylic or vinyl monomer that is unreactive with free isocyanate functionality and that is polymerizable in the presence of a free radical initiator; (2) preparing a fully reacted polyurethane within the unreactive acrylic or vinyl monomer by adding to the monomer in the absence of a free radical initiator (a) an aromatic or aliphatic polyisocyanate, (b) an organic compound containing at least two active hydrogen atoms attached to oxygen, and (c) a hydrophilic organic compound containing at least two active hydrogen atoms attached to oxygen present in an amount sufficient to render the resulting polyurethane emulsifiable; (3) adding a sufficient amount of a $C_1$-$C_4$ alkyl alcohol to consume any residual isocyanate functionality; (4) emulsifying in water the fully reacted polyurethane and acrylic or vinyl monomer; (5) adding a free radical initiator to the resulting emulsification; and (6) polymerizing the acrylic or vinyl monomer using free radical polymerization procedures.

The urethane/acrylic-or-vinyl polymer aqueous dispersion made by this process is substantially different from that which results merely from blending the two components. The polyurethane and the acrylic or vinyl monomer are emulsified simultaneously, which causes the urethane polymer and the acrylic or vinyl monomer to reside in the same latex particle. The polymerization of the acrylic or vinyl monomer thus takes place in the presence of the polyurethane. These factors tend to produce a product with interpenetrating and semiinterpenetrating networks and to cause any reaction between functional groups placed on the two polymers to be more effective. This results in latexes having improved curing and hardening properties; improved resistance to water, organic solvents and environmental conditions; and improved tensile strength and modulus of elasticity.

DETAILED DESCRIPTION OF THE INVENTION

The polyurethane polymer component is prepared by reacting (i) an aromatic or aliphatic polyisocyanate with (ii) an organic compound having at least two active hydrogen atoms attached to oxygen and (iii) a hydrophilic organic compound containing at least two active hydrogen atoms attached to oxygen in a sufficient amount to render the resulting polyurethane emulsifiable, within an ethylenically unsaturated monomer unreactive with free isocyanate.

The aromatic or aliphatic polyisocyanates preferably are diisocyanates, such as, methylene-diphenyldiisocyanate, methylene-bis(4-cyclohexyl-isocyanate), isophorone diisocyanate, toluene diisocyanate, 1,5-naphthalene diisocyanate, 4,4'-diphenyl-methane diisocyanate, 2,2'-dimethyl-4,4'-diphenyl-methane diisocyanate, 4,4'-dibenzyl-diisocyanate, 1,3-phenylene diisocyanate, 1,4-phenylene diisocyanate, mixtures of 2,4- and 2,6-toluene diisocyanate, 2,2'-dichloro-4,4'-diisocyanato diphenyl-methane, 2,4-dibromo-1,5-diisocyanato naphthalene, butane-1,4-diisocyanate, hexane-1,6-diisocyanate, and cyclohexane-1,4-diisocyanate.

Masked isocyanates, which release free isocyanate groups at higher temperatures, are also useful and include, but are not limited to, dimeric-2,4-tolylene diisocyanate, and polyisocyanates that have had their isocyanate groups blocked with, for example, phenol, tert-butanol, phthalimide, caprolactam, and the like. Generally, the preferred useful masked polyisocyanates are the diisocyanates; however, small amounts of triisocyanates and those of higher functionality may be used, provided their use does not cause gelling of the polymerization mixture.

The organic compounds that are reactive with isocyanate and that may be used for the preparation of the polyurethane polymers of this invention have at least two active hydrogen atoms (as determined by the Zerewitinoff method) attached to oxygen atoms, and are commonly referred to as polyhydroxy compounds.

These compounds will have a number average molecular weight of about 300 to 20,000, preferably about 500 to 5,000. Preferably, these compounds will be linear in order to prevent gelling during polymerization, but small amounts of non-linear compounds may be used provided their use does not cause gelling.

The polyhydroxy compounds will comprise compounds such as polyether diols, polyethers, polyester diols, polyacetal diols, polyamide diols, polyester polyamide diols, poly(alkylene ether)diols, polythioether diols, and polycarbonate diols. It is preferred to use difunctional compounds although small amounts of tri-(and greater) functional compounds may be used.

Suitable polyether diols are, for example, the condensation products of ethylene oxide, propylene oxide, butylene oxide, or tetrahydrofuran, and their copolymerization, graft or block polymerization products, such as, mixed ethylene oxide, propylene oxide condensates, and the graft polymerization products of the reaction of olefins under high pressure with the mentioned alkylene oxide condensates. Suitable polyethers are prepared by the condensation of the mentioned alkylene oxides with polyhydric alcohols, such as, ethylene glycol, 1,2-propylene glycol and 1,4-butanediol.

Suitable polyester diols, polyester amide diols, and polyamide diols are preferably saturated, and are obtained, for example, from the reaction of saturated or unsaturated polycarboxylic acids with saturated or unsaturated polyhydric alcohols. Suitable carboxylic acids for preparing these compounds include, for example, adipic acid, succinic acid, phthalic acid, terephthalic acid, and maleic acid. Suitable polyhydric alcohols for preparing the polyester diols include, for example, ethylene glycol, 1,2-propylene glycol, 1,4-butanediol, neopentyl glycol, hexanediol, and trimethylolpropane. A suitable amino alcohol for preparing polyester amide diols is, for example, ethanolamine. Suitable diamines for preparing polyesteramide diols and polyamide diols are, for example, ethylene diamine and hexamethylene diamine.

Suitable polyacetals can be prepared, for example, from 1,4-butanediol or hexanediol and formaldehyde. Suitable polythioether diols can be prepared, for example, by the condensation of thiodiglycol with ethylene oxide, proplylene oxide, butylene oxide or tetrahydrofuran. Polyhydroxy compounds that already contain urethane groups, and natural polyols, which may be further modified, for example, castor oil and carbohydrates, may also be used.

In order to produce a urethane polymer that is readily emulsifiable, it is necessary to incorporate hydrophilic functionality into the polymer chain. This may be done by the incorporation of a variety of nonionic, anionic, cationic, or amphoteric hydrophilic moieties, or mixtures of them, into an organic compound having at least two active hydrogen atoms attached to oxygen, and reacting that compound (together with the above described organic compounds having no hydrophilic functionality) with a diisocyanate as described above to form the polyurethane. Preferably, this is done by the method taught in U.S. Pat. No. 4,061,618, which involves the incorporation of 2% to 12% by weight of the urethane polymer of nonionic moieties derived from polyethylene glycol.

The polyethylene glycols used are preferably those that are available commercially and produced by the reaction of ethylene oxide with water, ethylene glycol, or diethylene glycol in the presence of sodium hydroxide as a catalyst. These polyethylene glycols are characterized by the structure: $H(OCH_2CH_2)_xOH$, in which X is an integer from 13 to about 450, preferably from about 90 to 136. These polyethylene glycols have number average molecular weights of about 600 to 20,000, preferably about 4,000 to 8,000. A polyethylene glycol that is homogeneous in molecular weight, or a mixture of polyethylene glycols that differ in molecular weight can be used. It is also possible to copolymerize small amounts of additional alkylene oxides into the polyethylene glycol provided that the hydrophilic nature of the glycol is not destroyed.

Alternatively, the polyurethane may be made emulsifiable by the incorporation of appropriate amounts of various anionic, cationic or amphoteric compounds. An example of a compound suitable for introducing an anionic group into the polyurethane is dimethylolopropane carboxylic acid. The addition of about 1% to 5% of an anionic compound by weight of the polyurethane should provide sufficient hydrophilic properties to render the urethane emulsifiable. Examples of compounds suitable for introducing cationic groups into the polyurethane include the tertiary amines N-methyl diethanoldiamine and N-ethyldiisopropanolamine. The addition of about 1% to 7% of these cationic compounds by weight of the polyurethane should provide sufficient hydrophilic properties to render the urethane emulsifiable. The anionic or cationic group containing compounds may be partially or wholly neutralized with acids or bases to a degree suitable for adequate emulsification of the particular formulation, but not to a degree to cause the polyurethane to enter into solution. Examples of compounds suitable for introducing amphoteric groups into the polyurethane include the quaternary compounds obtained by reacting the aforementioned amines with typical quaternizing agents, such as, dimethyl sulfate and methyl halides. The addition of about 1% to 5% of these amphoteric compounds by weight of the polyurethane should provide sufficient hydrophilic properties to render the urethane emulsifiable.

In preparing the polyurethane polymer, in addition to the organic compound having at least two active hydrogen atoms attached to oxygen, which in many cases is a high molecular weight compound, it may be desirable to chain extend the polymer using an organic compound with a lower number average molecular weight, preferably less than about 300 and more than 60. Typical chain extending agents include saturated or unsaturated glycols, such as, ethylene glycol, diethylene glycol, triethylene glycol and the like, and tertiary amines, such as, N-methyldiethanol-amine, N-oleyl diethanolamine, N-cyclohexyl diisopropanolamine, N,N-dihydroxyethyl-p-toluidine, N,N-dihydroxy-propylnaphthylamine and the like. The preferred chain extending agents are aliphatic diols. In any case, the chain extending agent should be chosen so as not to form any urea linkages.

If it is desired not to chain extend the polymer, the reaction of the diisocyanate with the organic compound having two active hydrogen atoms and the hydrophilic organic compound is quenched by the addition of a lower alkyl (usually $C_1$-$C_4$ alkyl) alcohol to consume any residual isocyanate functionality. For these systems, the preferred quenching compound is ethanol.

The preparation of the polyurethane is carried out in any acrylic or vinyl monomer that does not contain hydrogens active with isocyanate and that is capable of free radical polymerization. The acrylic or vinyl monomer should be selected so that the resultant urethane polymer will be soluble in that monomer. The most commonly employed monomers are the $C_1$ to $C_{12}$ esters of acrylic and methacrylic acids including, but not limited to, methyl acrylate, ethyl acrylate, n-butyl acrylate, isobutyl acrylate, n-propyl or iso-propyl acrylate, as well as the corresponding methacrylates; mixtures of compatible (meth)acrylate monomers, such as, mixtures of butyl and methyl methacrylate; vinyl esters, such as vinyl acetate and vinyl propionate; vinyl ethers; fumarates and maleates; styrene, acrylonitrile; ethylene; and mixtures of them. The choice of the particular monomer or monomers is dependent not only on the solubility of the resultant urethane but also upon the desired end use. For example, one skilled in the art would recognize that monomers can be selected to produce adhesives or coatings with particular properties, for example, pressure sensitive or non-pressure sensitive adhesives, structural adhesives, or conductive adhesives.

The urethane polymerization is carried out in the acrylic or vinyl monomer with or without typical urethane reaction catalysts known in the art. Suitable catalysts include dibutyl tin dilaurate; the stannous salts of carboxylic acids having from 2 to 18 carbon atoms, such as, stannous laurate, stannous stearate, stannous acetate, stannous butyrate, stannous octoate and the like, and mixtures of those. Other suitable catalysts include dibutyl tin dimaleate, tributyl tin oxide, dibutyl tin sulfide, lead resinate, lead benzoate, lead salicylate, lead 2-ethyl hexoate, lead oleate, iron acetyl acetonate, cobalt benzoate, tetra (2-ethyl hexyl) titanate, tetra butyl titanate, and the like. Many other compounds accelerate the reaction of a hydroxyl or other groups with an isocyanate in preference to certain other reactions of the isocyanate group, and any of these compounds may be used. Those skilled in the art will choose a specific catalyst to confer desired characteristics to individual urethane reactions. The preceding specific compounds are the preferred compounds and are given for the purpose of illustration and not limitation. In addition, any suitable tertiary amine may be used alone or with the metallic catalyst, for example, triethylene diamine, N-ethyl morpholine, N-methyl morpholine, or 4-dimethyl amino ethyl piperazine.

With respect to the proportion of reactants, the reactants should be selected so that the molecular ratio of isocyanate groups to active hydrogen atoms (including those from the hydrophilic compound and any chain extending agent) is as close to 1:1 as is practicable. It is appreciated that this exact ratio may not always be attained in practice; therefore, a ratio between about 0.7:1 and 1.3:1, and preferably between about 0.9:1 and 1.2:1, should be sought, and any excess diisocyanate, as discussed previously, can be quenched with an alcohol. The hydrophilic functionality will be present in an amount from 2% to 12%, preferably from 4% to 8%, by weight of total polymer solids. Depending upon the desired end use, and the particular urethane polymer and its molecular weight, the amount of urethane employed will vary from about 5% to 75% by weight of the urethane/acrylic-or-vinyl latex, preferably from 15% to 40% by weight.

The polymerization is carried out at temperatures in the range of 25°–120° C. for about 1–10 hours to produce a fully reacted polyurethane dissolved in the acrylic or vinyl monomer. Suitable emulsifiers or surfactants are added to this mixture, and the mixture then emulsified in water. Alternatively or additionally, emulsifiers or surfactants may be added to the water during the emulsification step. The choice of surfactant or emulsifier will affect the particle size of the resulting emulsion, and the particles in general will range in size from 0.1 micron to macroscopic beads or pearls. After the emulsification step, the acrylic or vinyl monomer is polymerized using conventional free radical emulsion polymerization procedures.

Suitable polymerization catalysts are the water-soluble free-radical-formers generally used in emulsion polymerization, such as, hydrogen peroxide, sodium persulfate, potassium persulfate and ammonium persulfate, and tert-butyl hydroperoxide, in amounts from 0.01% to 3% by weight, preferably 0.01% to 1% by weight, based on the total emulsion solids. These catalysts can be used alone or together with reducing agents, such as, sodium formaldehyde-sulfoxylate, ferrous salts, sodium dithionite, sodium hydrogen sulfite, sodium sulfite, or sodium thiosulfate, to perform as redox catalysts, which will be present in amounts from 0.01% to 3% by weight, preferably 0.01% to 1% by weight, based on the total emulsion solids. The free-radical-formers can be charged to the polymerization in the aqueous emulsifier solution or can be added during the polymerization in doses.

The polymerization is carried out at a pH of between 2 and 7. preferably between 3 and 5. In order to maintain the pH range, it may be useful to work in the presence of customary buffer systems, for example, alkali metal acetates, alkali metal carbonates, or alkali metal phosphates. Polymerization regulators like mercaptans, aldehydes, chloroform, ethylene chloride and trichloroethylene, may also be added in some cases.

The polymerization reaction is generally continued until the residual-free monomer content is below 1% by weight of emulsion solids. The completed reaction product is then allowed to cool to room temperature while sealed from the atmosphere.

The resultant material is an aqueous dispersion of particles containing both a polyurethane and a polymer comprising residues from the acrylic or vinyl monomer (or monomers, if more than one was used). In some cases the result will be an aqueous dispersion containing a graft polymer of the unsaturated monomer grafted to the polyurethane. Generally, the final latex polymer will have 30% to 65% solids, and preferably about 45% solids; an intrinsic viscosity in the range of about 0.5 to 3, preferably 1.0 to 2.5; particle sizes of 0.2 to 1 micron, preferably 0.2 to 0.5 microns; and a solution viscosity of 500 to 5000 mPas (cps), typically 1000 to 3000. The film characteristics vary from tacky to crystalline, depending upon the raw materials utilized.

EXAMPLES

Example 1

This example describes the preparation of a urethane/acrylic aqueous dispersion.

A 3 liter flask was set up equipped with a thermometer, a gas inlet tube, a slow addition tube, an agitation/-stirring, heating/cooling means, and a condenser.

Total ingredients for the product were the following:

| | | | |
|---|---|---|---|
| Initial Charge: | 1. | Polytetramethylene glycol (2000 mol. wt.) | 99.2 g |
| | 2. | Polyethylene glycol (6000 mol. wt.) | 9.9 |
| | 3. | Methylen bisphenyl diisocyanate | 13.0 |
| | 4. | Dibutyl tin dilaurate | 0.05 |
| | 5. | 2-Ethyl hexyl acrylate | 205.5 |
| | 6. | Methyl acrylate | 68.5 |
| | 7. | Aerosol TR-70 (American Cyanamid) | 6.0 |
| Second | 8. | Ethyl alcohol | 200.0 |
| Charge: | 9. | Aerosol MA (American Cyanamid) | 0.6 |
| | 10. | siponic L-4 (canadian Alcolac Ltd.) | 5.7 |
| | 11. | Abex 26s | 13.3 |
| | 12. | Sodium vinyl sulfonate | 2.8 |
| | 13. | Acetoacetoxyethyl methacrylate | 2.7 |
| | 14. | Acrylic acid | 8.2 |
| Slow Add 1: | 15. | Water | 262.9 |
| Third Charge: | 16. | Water | 6.0 |
| | 17. | Sodium persulfate | 0.27 |
| Slow Add 2: | 18. | Water | 15.0 |
| | 19. | Sodium persulfate | 0.81 |
| Fourth Charge: | 20. | Water | 3.0 |
| | 21. | t-butyl hydroperoxide | 0.27 |
| Slow Add 3: | 22. | Water | 3.0 |
| | 23. | Sodium formaldehyde sulfoxalate | 0.27 |

The reaction vessel was purged with dry nitrogen and the initial charge was charged to the flask. A stream of dry air was introduced below the reaction surface and maintained there during the reaction. The contents were heated to 80° C. with stirring. After a period of 11 hours, a viscosity of approximately 30,000 to 40,000 mPas (cps) was attained. At this point the second charge was added and the reaction was cooled to 60° C. Then water (262.9 g) was slow-added over a period of 3 hours to effect emulsification of the mixture. The reaction vessel was then alternately subjected to a vacuum and purged with nitrogen, three times. A slow stream of nitrogen was bled through the vessel for the remainder of the reaction. A temperature of 60° C. was maintained throughout the remainder of the reaction. At this point, the third charge, 0.27 g sodium persulfate dissolved in 6 g water, was added, and the slow addition over 3 hours of 0.81 g sodium persulfate dissolved in 15 g wager was begun. At the end of the 3 hours slow addition, the fourth charge, a mixture of 3 g water and 0.27 g t-butyl hydroperoxide, was added and the reaction was cooled to room temperature. Then 0.27 g sodium formaldehyde sulfoxylate dissolved in 3 g water was added over a period of ½ hour. The resulting urethane/acrylic latex had the following properties:

| | |
|---|---|
| % Solids | 46.2 |
| Intrinsic viscosity of polyurethane (taken before acrylic polymerization) | 0.83 |
| Intrinsic viscosity of final latex polymer | 2.49 |
| pH 2.9 adjusted to | 6.5 |
| Particle size | 0.49 micron |
| Viscosity | 3400 mPas (cps) |
| Film characteristic | slight tacky |
| % urethane | 30.0% |

The product had the typical milky appearance of an aqueous polymeric dispersion.

Example 2

This example illustrates the use of a different acrylic monomer in a composition similar to that of Example 1. A reaction vessel was set up as in Example 1. The total ingredients for the product of this example were the following:

| | | | |
|---|---|---|---|
| Initial Charge: | 1. | Polytetramethylene glycol (2000 mol. wt.) | 99.2 g |
| | 2. | Polyethylene glycol (6000 mol. wt.) | 9.9 |
| | 3. | Methylene bisphenyl diisocyanates | 13.0 |
| | 4. | Dibutyl tin dilaurate | 2 drops |
| | 5. | 2-Ethyl hexyl acrylate | 27.4 |
| | 6. | Ethyl acrylate | 246.6 |
| | 7. | Aerosol TR-70 (American Cyanamid) | 6.0 |
| Second | 8. | Ethyl alcohol | 200.0 |
| Charge: | 9. | Aerosol MA (American Cyanamid) | 0.6 |
| | 10. | Siponic L-4 | 5.7 |
| | 11. | Abex 26S (Alcolac Inc.) | 13.3 |
| | 12. | Sodium vinyl sulfonate | 2.8 |
| | 13. | Acetoacetoxyethyl methacrylate | 2.7 |
| | 14. | Acrylic acid | 8.2 |
| Slow Add 1: | 15. | Water | 262.9 |
| Third Charge: | 16. | Water | 6.0 |
| | 17. | Sodium persulfate | 0.27 |
| Slow Add 2: | 18. | Water | 15.0 |
| | 19. | Sodium persulfate | 0.81 |
| Fourth Charge: | 20. | Water | 3.0 |
| | 21. | t-butyl hydroperoxide | 0.27 |
| Slow Add 3: | 22. | Water | 3.0 |
| | 23. | Sodium formaldehyde sulfoxalate | 0.27 |

The resulting urethane/acrylic latex had the following properties:

| % Solids | 45.9 |
| --- | --- |
| pH | 7.4 |
| particle size | 0.356 u |
| film | clear, smooth |

Example 3

A urethane/acrylic latex was made as in Examples 1 and 2 except for the following changes:

| 2-Ethyl hexyl acrylate | 205.5 |
| --- | --- |
| Methyl acrylate | 68.5 |
| Ethyl acrylate | — |

The resulting urethane/acrylic latex had the following properties:

| % Solids | 45.3 |
| --- | --- |
| pH | 6.2 |
| particle size | 0.457 u |
| film | clear |

Example 4

A urethane/acrylic latex was produced according to the procedure of Example 1 using the following materials:

| Initial Charge: | 1. | Polytetramethylene glycol (2000 mol. wt.) | 99.2 |
| --- | --- | --- | --- |
| | 2. | Polyethylene glycol (6000 mol. wt.) | 9.9 |
| | 3. | Methylene bisphenyl diisocyanate | 13.0 |
| | 4. | 2-ethyl hexyl acrylate | 271.0 |
| | 5. | Acrylic acid | 13.9 |
| Charge: | 6. | Aerosol TR-70 (American Cyanamid) | 6.0 |
| | 7. | Ethyl alcohol | 200.0 |
| Slow Add 1: | 8. | Deionized water | 262.9 |
| | 9. | siponic L-4 (Canadian Alcolac Ltd.) | 5.4 |
| | 10. | Aerosol MA (American Cyanamid) | 3.2 |
| | 11. | Alipal 120 (GAF Corp.) | 0.5 |
| | 12. | Sodium persulfate | 1.08 |
| | 13. | t-butyl hydroperoxide | 0.27 |
| | 14. | Sodium formaldehyde sulfoxylate | 0.27 |
| Slow Add 2: | 15. | Deionized water | 25.0 |

The resultant urethane/acrylic latex had the following properties:

| % Solids | 49.11 |
| --- | --- |
| pH | 2.6 |
| Intrinsic viscosity | 0.82 |
| Viscosity | 1125 mPas (cps) |
| Film | clear, tacky |
| % Urethane | 30% |

The pH of the dispersion was adjusted to 5.1 with ammonium hydroxide to provide a more neutral pressure sensitive adhesive.

Example 5

A urethane/acrylic latex was produced according to the procedure of Example I. Total ingredients for the product were the following:

| Initial Charge: | 1. | 1,6-Hexane diol neopentyl glycol adipate (3000 mw) | 103.0 |
| --- | --- | --- | --- |
| | 2. | Polyethylene glycol (6000 mw) | 10.1 |
| | 3. | Methylene bisphenyl diisocyanate | 9.0 |
| | 4. | Dibutyl tin dilaurate | 2 drops |
| | 5. | 2-ethyl hexyl acrylate | 205.5 |
| | 6. | Methyl acrylate | 68.5 |
| | 7. | Aerosol TR-70 | 6.0 |
| Charge: | 8. | Ethyl alcohol | 200.0 |
| | 9. | Aerosol MA (American Cyanamid) | 0.6 |
| | 10. | Siponic L-4 (Canadian Alcolac Ltd.) | 5.7 |
| | 11. | Abex 26S | 13.4 |
| | 12. | Sodium vinyl sulfonate | 2.8 |
| | 13. | Acetoacetoxyethyl methacrylate | 2.7 |
| | 14. | Acrylic acid | 8.2 |
| Slow Add 1: | 15. | Deionized water | 262.9 |
| | 16. | Sodium persulfate | 0.27 |
| | 17. | t-butyl persulfate | 0.81 |
| | 18. | Sodium formaldehyde sulfoxylate | 0.27 |
| | 19. | Deionized water | 27.0 |

The urethane/acrylic latex had the following properties:

| % Solids | 43.1 |
| --- | --- |
| Intrinsic Viscosity | 0.66 |
| Viscosity | 5250 mPas (cps) |
| % Urethane | 30% |

Example 6

The tacky product of Example 3 was tested as a pressure sensitive adhesive. The product was coated to 2 mil thickness on polyethylene terephthalate (Mylar) film at 18 dry lbs/ream and tested on stainless steel panels for peel adhesion, loop tack, hold, and Williams plasticity values.

Peel Adhesion (180°) is defined as the force required to remove a pressure sensitive tape from a panel or its own backing at a specified angle and speed. The tape is applied to a standard test panel using a determined definite pressure to make contact. The force is expressed in ounces per inch width of tape. The test is more fully described in the Manual of the Pressure Sensitive Tape Council, page 27, test PSTC-1.

Loop tack is a measure of the tackiness of a pressure sensitive adhesive coating using a TMI-TLMI Loop, Tack Testor Model #80-16. The force is expressed in ounces per square inch.

Hold is a measure of shear adhesion or cohesive strength and is defined as the force necessary to remove the tape from a standard flat surface in a direction parallel to the surface to which it has been affixed under a predetermined definite pressure. Results are given as time required to remove a standard tape area from a test panel using a standard load, or as distance displaced in a given time under a standard load. The test is more fully described in the Manual of the Pressure Sensitive Tape Council, page 40, test PSTC-7.

The Williams Plasticity test measures the overall cohesive and flow properties of the pressure sensitive material. The test is based on the ASTM procedure D-926 in which a two gram ball of the sample is placed in a Williams plastometer, Model P-4. The oven or test chamber is set at 100° F. and a stress load of 5 kg is used. The sample, which is allowed to reach thermal equilibrium, is placed between the plastometer plates. Fourteen (14) minutes after the weight is applied to the sample, a specimen thickness is read in millimeters. The results represent the resistance to flow of a polymer at elevated temperatures. The higher the values, the greater the resistance to flow. The results are the following:

| | |
|---|---|
| 80° peel: 20 minutes on panel | 2.2 pli |
| 180° peel: 24 hours on panel | 2.4 pli |
| Loop tack | 49 oz/in$^2$ |
| Hold: 2 psi | 32 min. |
| 4 psi | 2 min. |
| Williams Plasticity No (pn) | 1.08 mm |

As the results show, the adhesive composition possessed satisfactory pressure sensitive properties.

Example 7

The products of Example 2 and 3 were examined in a vinyl vacuum bonding process for automotive quarter panels.

Vinyl to birch bonds were made at 290° F. activation temperature and tested for peel using PSTC-14 ("adhesion of pressure-sensitive tape to fiberboard @90° angle and constant stress") at room temperature and at 180° F. after 4 hours exposure. The results are the following and show good adhesion to vinyl.

| | Room Temperature | 4 hours @ 180° F. |
|---|---|---|
| Example 2 | 5 pli (cohesive failure) | 0.2 pli (cohesive failure) |
| Example 3 | 10.5 pli (adhesive failure) | 0.8 pli (adhesive failure) |

Example 9

This is an example comparing the performance of a urethane/acrylic latex of the present invention with a blend of an acrylic latex and a urethane, blended to a similar composition.

A urethane/acrylic latex was prepared according to Example 1 using 30 parts of Component A and 70 parts of Component B as shown in the table below. All composition parts are given by weight. An acrylic latex was made via conventional acrylic latex polymerization techniques and designated Example A. A urethane latex was prepared according to the process described in U.S. Pat. No. 4,061,618 and designated Example B. Examples A and B were combined to form Example C having a ratio of 70 parts acrylic and 30 parts urethane. Example C thus represented a blend of the acrylic latex and the urethane latex with a composition corresponding to the urethane/latex of Example 1.

The adhesives of Examples 1 and C were compared. The results are also presented in the table below and show the substantial improvements in properties in accordance with the present invention as contrasted with a similar adhesive composition prepared by merely blending the acrylic and urethane constituents.

| Composition: Ex. 1 | Ex. A | Ex. B | Ex. C |
|---|---|---|---|
| Component A<br>75 pts 2-ethyl hexyl acrylate<br>25 pts methyl acrylate<br>1 pt acetylacetomethacrylate<br>3 pts acrylic acid | 75 pts 2-ethyl hexyl acrylate<br><br>25 pts Methyl-acrylate<br><br>1 pt Acetyloaceto-methacrylate<br><br>3 pts acrylic acid | 36.2 pts Polytetra-methylene glycol 2000 MW<br><br>4.7 pts Methylene bis phenyl diisocyanate<br><br>3.6 pts Polyethylene glycol 6000 MW | 30 pts urethane of B<br><br>70 pts acrylic of A (solids basis) |
| Component B<br>36.2 pts Polytetramethylene glycol 2000 MW<br>4.7 pts Methylene bis phenyl diisocyanate<br>3.6 pts Polyethylene glycol 6000 MW | | | |

| Properties | Example 1 | Example A | B | C |
|---|---|---|---|---|
| % Solids | 46.2 | 53.7 | 33.4 | 45.5 |
| Intrinsic Viscosity (urethane | 2.49 | — | — | — |
| component) | 0.83 | — | 0.73 | 0.89 |
| pH | 6.7 | — | 6.5 | 3.4 |
| Part. Size | 0.49 | 0.19 | 8.8 | 0.71 |
| Viscosity mPas (cps) | 3400 | — | 27,400 | 10,750 |
| % Urethane | 30% | — | 100% | 30 |

-continued

| Test Results | Example 1 | Example C |
| --- | --- | --- |
| 2 mil PET (Mylar) Loop Test | 26 g/in$^2$ | 26 g/in$^2$ |
| 2 mil PET (Mylar) Peel (lb/linear in. 20 min) | 1.4 | 1.1 |
| static load (hours hold 2 psi) | >100 | 45 |
|  | 5.5 | 1.0 |
| 4 mil Vinyl peel (lbs/linear in 20 min) | 2.8 | 1.4 |
| Peel (24 hr) | 3.4 | 2.8 |
| 13 Peel after 1 week @ 158° F. |  |  |
| 20 min. | 2.5 | 0.7 |
| 24 hours | 2.9 | 1.5 |

Example 10

This is an example to show the practical difficulties of attempting to prepare a polyurethane having no urea linkages by a method that involves chain extending after dispersion into water, in contrast to the instant method by which any chain extension, if one is desired, would occur before dispersion into water. The polyurethane component was prepared by chain extending a urethane prepolymer with diethylene glycol.

Prepolymer Preparation

A dry four-neck 1 L round bottom flask equipped with 3 stoppers and a vacuum adapter was charged with 1 and 2 below.

| 1. | Polytetramethylene oxide (2000 Mn) | 221.3 g |
| --- | --- | --- |
| 2. | Polyethylene glycol (8000 Mn) | 24.0 g |
| 3. | Ethyl acrylate | 170.0 g |
| 4. | 2-Ethyl hexyl acrylate | 510.1 g |
| 5. | Methylenedi-p-phenyl diisocyanate | 47.4 g |
| 6. | Dibutyl tin dilaurate | 0.2 g |

The flask was heated to 100°–110° C. under high vacuum (<0.5 mm Hg) for 1 hr. The vacuum was released with nitrogen and the contents of the flask were allowed to cool to about 50° C. The flask was fitted with a mechanical stirrer, thermometer, a gas inlet-topped condenser and a stopper. The flask was placed under a positive pressure of dry air and then charged with 3 and 4. The resulting turbid solution was warmed to 50°–60° C., and 5 and 6 were added. The reaction was allowed to stir for 16 hours at 55°–60° C. at which time the residual isocyanate was found to be 0.48% (theory: 0.59%). This prepolymer was divided into two portions. Portion A was chain extended before emulsification; portion B was chain extended after emulsification. The two emulsifications were then polymerized. Portion A resulted in a stable dispersion; portion B did not.

Chain Extension/Emulsification of A

A dry four-neck 1 L round bottom flask equipped with a mechanical stirrer, thermometer, a gas inlet-topped condenser, and a stopper was charged with 435.9 g of the above described urethane prepolymer. The reaction vessel was placed under a positive pressure of dry air and then charged with 1 below.

| 1. | Diethylene glycol | 3.38 g |
| --- | --- | --- |
| 2. | Ethanol | 218.0 g |
| 3. | Aerosol TR-70 (American Cyanamid Company) | 8.91 g |
| 4. | Igepal CO-990 (GAF Corporation) | 6.42 g |
| 5. | Acrylic Acid | 22.4 g |
| 6. | Water | 472.0 g |

A large increase in viscosity was immediately observed. After 2 hours reaction time at 55°–60° C., the vessel was charged with 2. After several hours stirring, 3, 4, and 5 were added. When a homogeneous solution was obtained, 6 was added drop-wise over a 3 hour period at 55°–60° C. An emulsified polyurethane/monomer mix was obtained at the conclusion of the slow-addition.

Polymerization of A

The emulsified polyurethane/monomer mix A was brought to 70° C. Air was removed from the system by a five-minute sub-surface nitrogen purge. Subsequent to the purge, the reaction was kept under a positive pressure of nitrogen. The reaction mixture was charged with 1.43 g of $K_2S_2O_8$. The reaction was held at 70° C. for 5 hours during which an exotherm was noted during the first hour. An emulsion was obtained at the conclusion of the polymerization. The yield was 1079.9 g (40.5% solids).

Dispersion/Chain Extension of B

A four-neck 1 L round bottom flask equipped with a mechanical stirrer, thermometer, addition funnel, and condenser was charged with 1, 2, 3 and 4 below.

| 1. | Water | 633.0 g |
| --- | --- | --- |
| 2. | Acrylic Acid | 20.3 g |
| 3. | Aerosol TR-70 (American Cyanamid Company) | 8.91 g |
| 4. | Igepal CO-990 (GAF Corporation) | 6.42 g |

The addition funnel was charged with 402.0 g of the urethane prepolymer. The prepolymer was added dropwise over a 1 hour period to the rapidly stirred aqueous suspension. Upon completion of the prepolymer dispersion, 3.10 g of diethylene glycol was added and the reaction was allowed to stir at ambient temperature for 18 hours followed by 2 hours at 50° C. An emulsified polyurethane/monomer mix was obtained.

Polymerization of B

The emulsified polyurethane/monomer mix was brought to 70° C. Air was removed from the system by a five-minute sub-surface nitrogen purge. Subsequent to the purge, the reaction was kept under a positive pressure of nitrogen. The reaction mixture was charged with 1.40 g of $K_2S_2O_8$. The reaction was held at 70° C. for 0.75 hour at which time a vigorous exotherm was noted, and the reaction mixture coagulated. The polymerization was stopped at this time.

The above examples show that the described inventive method is a suitable process for producing polyurethane/acrylic-or-vinyl latexes in which the polyurethane component has no urea linkages.

I claim:

1. A process for preparing a polymeric urethane/acrylic-or-vinyl latex, in which the urethane polymer component has no urea linkages, comprising the sequential steps of:
   1) providing an acrylic or vinyl monomer that is
      (i) unreactive with free isocyanate functionality,
      (ii) polymerizable in the presence of a free radical initiator, and
      (iii) an effective solvent for the resultant urethane polymer;
   2) adding to the acrylic or vinyl monomer in the absence of a free radical initiator the following compounds in amounts such that the molecular ratio of isocyanate groups to active hydrogen atoms is about 1 to 1:
      (a) one or more polyisocyanates,
      (b) one or more organic compounds each containing at least two active hydrogen atoms attached to oxygen, and
      (c) one or more hydrophilic organic compounds, each containing at least two active hydrogen atoms attached to oxygen and present an a sufficient amount to render the resulting polyurethane emulsifiable, selected from the group consisting of a polyethylene glycol characterized by the structure $H(OCH_2CH_2)_xOH$ in which x is an integer from 13 to 450, dimethylolpropane carboxylic acid, N-methyl diethanoldiamine, N-ethyldiisopropanolamine, the quaternary reaction product of N-methyl diethanoldiamine with dimethyl sulfate or methyl halide, and the quaternary reaction product of N-ethyldiisopropanolamine with dimethyl sulfate or methyl halide;
   3) heating the resultant mixture from step 2) to a temperature in the range of 25° to 120° C. for about 1–10 hours to form a fully reacted polyurethane;
   4) adding a sufficient amount of a $C_1$-$C_4$ alkyl alcohol to consume any residual isocyanate functionality;
   5) emulsifying in water the fully reacted polyurethane and acrylic or vinyl monomer;
   6) adding a free radical initiator to the resulting emulsion; and
   7) polymerizing the acrylic or vinyl monomer using free radical polymerization procedures.

2. The process according to claim 1 in which the polyisocyanate is selected from the group consisting of methylene-diphenyl diisocyanate, methylene-bis(4-cyclohexyl-isocyanate), isophorone diisocyanate, toluene diisocyanate, 1,5-naphthalene diisocyanate, 4,4'-diphenyl-methanediisocyanate, 2,2'-dimethyl-4,4'-diphenyl-methane diisocyanate, 4,4'-dibenzyl-diisocyanate, 1,3-phenylene diisocyanate, 1,4-phenylene diisocyanate, mixtures of 2,4- and 2,6-toluene diisocyanate, 2,2'-dichloro-4,4'-diisocyanato diphenylmethane, 2,4-dibromo-1,5diisocyanato naphthalene, butane-1,4-diisocyanate, hexane-1,6-diisocyanate, and cyclohexane-1,4-diisocyanate.

3. The process according to claim 1 in which the hydrophilic organic compound is a polyethylene glycol having a number average molecular weight of 600 to 20,000, present in an amount from 2% to 12% by weight of the latex solids.

4. The process according to claim 3 in which the polyethylene glycol has a number average molecular weight of 4,000 to 8,000.

5. The process according to claim 1 in which the acrylic or vinyl monomer is selected from the group consisting of isopropyl acrylate, isopropyl methacrylate, n-propyl acrylate, n-propyl methacrylate, n-butyl acrylate, n-butyl methacrylate, vinyl acetate, styrene, and acrylonitrile.

6. The process according to claim 1 in which the urethane component comprises 5% to 75% by weight of the urethane/acrylic-or-vinyl latex solids.

* * * * *